US009450712B2

(12) United States Patent
Kim et al.

(10) Patent No.: US 9,450,712 B2
(45) Date of Patent: Sep. 20, 2016

(54) METHOD OF MONITORING CONTROL CHANNEL AND WIRELESS DEVICE USING SAME

(71) Applicant: LG ELECTRONICS INC, Seoul (KR)

(72) Inventors: Hak Seong Kim, Anyang-si (KR); Han Byul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 14/354,475

(22) PCT Filed: Oct. 26, 2012

(86) PCT No.: PCT/KR2012/008900
§ 371 (c)(1),
(2) Date: Apr. 25, 2014

(87) PCT Pub. No.: WO2013/062374
PCT Pub. Date: May 2, 2013

(65) Prior Publication Data
US 2014/0293975 A1  Oct. 2, 2014

Related U.S. Application Data

(60) Provisional application No. 61/551,931, filed on Oct. 27, 2011.

(51) Int. Cl.
*H04J 3/00* (2006.01)
*H04L 1/18* (2006.01)
(Continued)

(52) U.S. Cl.
CPC ........... *H04L 1/1861* (2013.01); *H04L 5/0053* (2013.01); *H04L 5/0055* (2013.01); *H04L 1/0046* (2013.01); *H04L 1/0072* (2013.01); *H04W 72/042* (2013.01)

(58) Field of Classification Search
CPC ................................................. H04W 72/0446
USPC .......................................................... 370/336
See application file for complete search history.

(56) References Cited

U.S. PATENT DOCUMENTS

2010/0329220 A1  12/2010  Kim et al.
2011/0038299 A1*  2/2011  Sugawara ............. H04L 12/189
                                                            370/312

(Continued)

FOREIGN PATENT DOCUMENTS

KR  10-2009-0099500 A  9/2009
KR  10-2011-0046371 A  5/2011
WO  WO 2010/053339 A2  5/2010

OTHER PUBLICATIONS

3GPP TSG-RAN WG1 #61, "On data transmission in RB used for R-PDCCH," Qualcomm Incorporated, May 10-14, 2010, pp. 1-2.
(Continued)

*Primary Examiner* — Samina Choudhry
(74) *Attorney, Agent, or Firm* — Birch, Stewart, Kolasch & Birch, LLP

(57) ABSTRACT

The present invention relates to a method of monitoring a control channel in a wireless communication system and a wireless device using same. The wireless device monitors a first downlink control channel having an uplink grant in a first slot, and a second downlink control channel having a hybrid automatic repeat request (HARQ) positive-acknowledgement (ACK)/negative-acknowledgement (NACK) in a second slot.

9 Claims, 14 Drawing Sheets

(51) Int. Cl.
*H04L 5/00* (2006.01)
*H04W 72/04* (2009.01)
*H04L 1/00* (2006.01)

(56) References Cited

U.S. PATENT DOCUMENTS

| | | | |
|---|---|---|---|
| 2011/0107169 A1* | 5/2011 | Lohr | H04W 72/042 714/748 |
| 2011/0188428 A1* | 8/2011 | Ishii | H04W 72/04 370/311 |
| 2011/0211503 A1 | 9/2011 | Che et al. | |
| 2012/0033588 A1 | 2/2012 | Chung et al. | |
| 2012/0218964 A1 | 8/2012 | Park et al. | |

OTHER PUBLICATIONS

LG Electronics, "Discussion on DL/UL control channel for HARQ with ePDCCH," 3GPP TSG RAN WG1 Meeting #66 bis, Zhuhai, China, Oct. 10-14, 2011, R1-113197, 4 pages.

Motorola Mobility, "Enhanced control channels for LTE Rel-11," 3GPP TSG RAN WG1 #66bis, Zhuhai, China, Oct. 10-15, 2011, R1-113261, pp. 1-3.

* cited by examiner

METHOD OF MONITORING CONTROL CHANNEL AND WIRELESS DEVICE USING SAME

CROSS-REFERENCE TO RELATED APPLICATIONS

This application is the National Phase of PCT/KR2012/008900 filed on Oct. 26, 2012, which claims priority under 35 U.S.C. §119(e) to U.S. Provisional Application No. 61/551,931 filed on Oct. 27, 2011, all of which are hereby expressly incorporated by reference into the present application.

BACKGROUND OF THE INVENTION

1. Field of the Invention

The present invention concerns wireless communications, and more specifically, to methods of monitoring control channels in wireless communication systems and wireless devices using the same.

2. Related Art

3GPP (3rd Generation Partnership Project) TS (Technical Specification) Release 8-based LTE (long term evolution) is the potent next-generation mobile communication standard. Recently, LTE-A (LTE-advanced), based on 3GPP TS Release 10 supporting multiple carriers is under ongoing standardization efforts.

As set forth in 3GPP TS 36.211 V10.2.0 (2011-06) "Evolved Universal Terrestrial Radio Access (E-UTRA); Physical Channels and Modulation (Release 10)," physical channels in 3GPP LTE/LTE-A may be classified into downlink channels including PDSCH (Physical Downlink Shared Channel) and PDCCH (Physical Downlink Control Channel) and uplink channels including PUSCH (Physical Uplink Shared Channel) and PUCCH (Physical Uplink Control Channel).

In order to respond to increasing data traffic, various techniques are being introduced to increase transmission capacity in mobile communication systems, such as MIMO (Multiple Input Multiple Output) enabling use of multiple antennas and multi-cell supportive carrier aggregation.

Control channels designed in 3GPP LTE/LTE-A deliver various kinds of control information. As novel techniques come out, increasing capacity of control channels is demanded together with enhancing scheduling flexibility.

SUMMARY OF THE INVENTION

The present invention provides methods of monitoring downlink control channels and wireless devices using the same.

In an aspect, a method of monitoring a control channel in a wireless communication system is provided. The method includes monitoring, by a wireless device, a first downlink control channel including an uplink grant in a subframe, and monitoring, by the wireless device, a second downlink control channel including a hybrid automatic repeat request (HARQ) positive-acknowledgement (ACK)/negative-acknowledgement (NACK) in the subframe. The subframe includes a first slot and a second slot in time domain. The first downlink control channel is monitored in the first slot and the second downlink control channel is monitored in the second slot.

The first and second slots may include a plurality of resource blocks (RBs).

The first downlink control channel may be monitored in at least one first RB of the first slot, and the second downlink control channel may be monitored in at least one second RB of the second slot.

An index of the at least one first RB may be equal to an index of the at least one second RB.

In another aspect, a wireless device for monitoring a control channel in a wireless communication system is provided. The wireless device includes a radio frequency (RF) unit configured to transmit and receive a radio signal, and a processor operatively connected with the RF unit and configured to monitor, via the RF unit, a first downlink control channel including an uplink grant in a subframe and monitor, via the RF unit, a second downlink control channel including a hybrid automatic repeat request (HARQ) positive-acknowledgement (ACK)/negative-acknowledgement (NACK) in the subframe.

A base station may multiplex a plurality of downlink control channels, and a wireless device may monitor a plurality of downlink control channels. Specifically, the wireless device may detect specific downlink control information and may thus monitor a downlink control channel having a larger payload.

DESCRIPTION OF EXEMPLARY EMBODIMENTS

A wireless device may be stationary or mobile and a UE (User Equipment) may be referred to as an MS (mobile station), an MT (mobile terminal), a UT (user terminal), an SS (subscriber station), a wireless device, a PDA (personal digital assistant), a wireless modem, or a handheld device. Or, a wireless device may be a device that supports only data communication such as an MTC (machine-type communication) device.

A BS (base station) generally denotes a fixed station that communicates with a wireless device and may be referred to as an eNB (evolved-NodeB), a BTS (Base Transceiver System), or an access point.

Hereinafter, the present invention is described to apply based on 3GPP (3d Generation Partnership Project) TS (Technical Specification) release 8-based 3GPP LTE (long term evolution) or 3GPP TS release 10-based 3GPP LTE-A. This is merely an example, and the present invention may apply to various wireless communication networks. Hereinafter, the "LTE" comprises LTE and/or LTE-A.

A wireless device may be served by a plurality of serving cells. Each serving cell may be defined with a DL (downlink) CC (component carrier) or with a pair of a DL CC and a UL (uplink) CC.

Serving cells may be classified into primary cells and secondary cells. A primary cell operates at a first frequency and is a cell that performs an initial connection establishment process or a connection reestablishment process or that is designated as a first cell during a handover process. The first cell is also denoted as a reference cell. A secondary cell operates at a second frequency, may be configured after an RRC (radio resource control) connection is established, and may be used to provide an additional radio resource. At least one primary cell is always configured, and secondary cell(s) may be added/modified/released by upper layer signaling (e.g., RRC (radio resource control) message).

The CI (cell index) of a primary cell may be fixed. For example, a lowest CI may be designated as the CI of a primary cell. Hereinafter, the CI of a primary cell is 0, and CIs of secondary cells are sequentially assigned 1 and its subsequent numbers.

Figure 1:
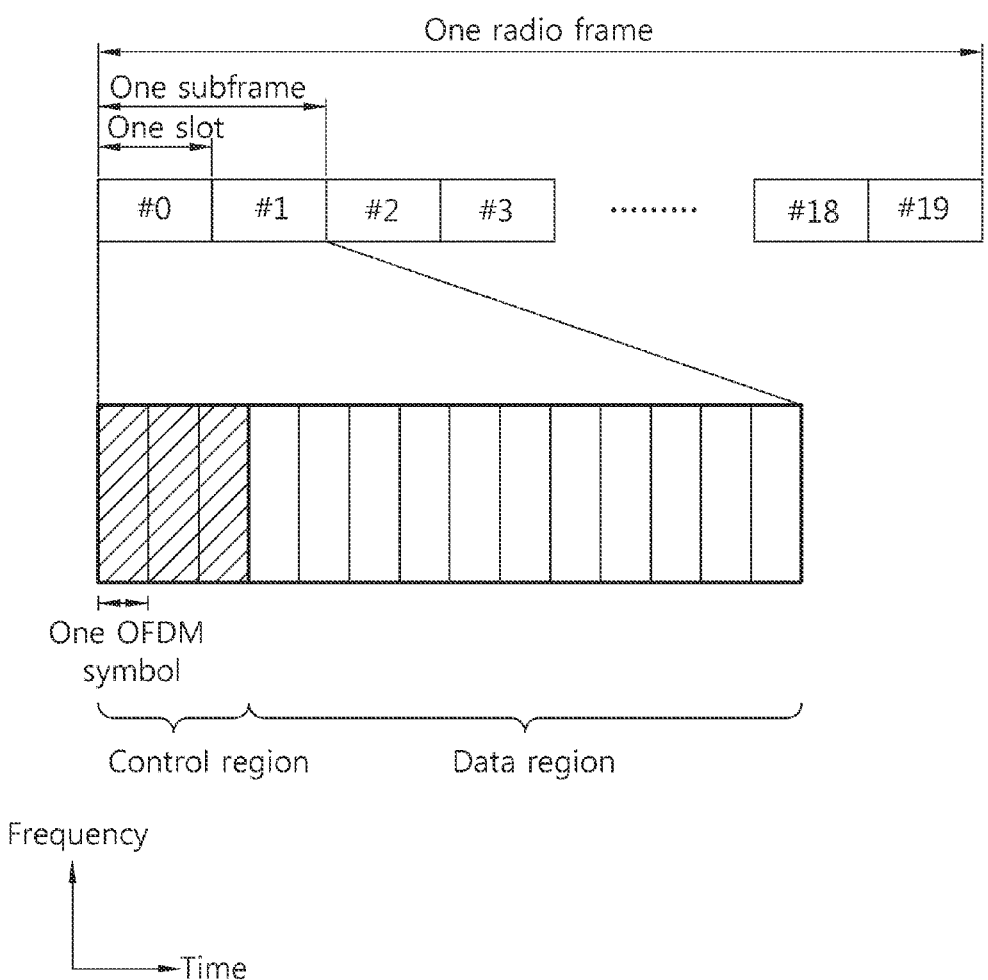
FIG. 1 shows the structure of a 3GPP LTE-A downlink radio frame.

FIG. 1 shows the structure of a 3GPP LTE-A downlink radio frame. See 3GPP TS 36.211 V10.2.0 (2011-06) "Evolved Universal Terrestrial Radio Access (E-UTRA); Physical Channels and Modulation (Release 10)," Ch. 6.

A radio frame includes 10 subframes indexed 0 to 9. One subframe includes two consecutive slots. The time taken for one subframe to be transmitted is denoted a TTI (transmission time interval). For example, the length of one subframe is 1 ms, and the length of one slot is 0.5 ms.

One slot may include a plurality of OFDM (orthogonal frequency division multiplexing) symbols in the time domain. The term "OFDM symbol" is used solely to represent one symbol period in the time domain because 3GPP LTE adopts OFDMA (orthogonal frequency division multiple access) on downlink (DL), and multiple access schemes or names are not limited thereto. For example, the OFDM symbol may also be denoted as an SC-FDMA (single carrier-frequency division multiple access) symbol or symbol period.

One slot includes, e.g., seven OFDM symbols. However, the number of OFDM symbols included in one slot may vary depending on the length of a CP (cyclic prefix). According to 3GPP TS 36.211 V10.2.0, one slot includes seven OFDM symbols in normal CP and six OFDM symbols in extended CP.

A resource block (RB) is a unit of resource allocation. One slot includes a plurality of sub-carriers. For example, if one slot includes seven OFDM symbols in the time domain and a resource block includes 12 sub-carriers in the frequency domain, the resource block may include 7×12 REs (resource elements).

A DL (downlink) subframe is separated into a control region and a data region in the time domain. The control region includes up to first four OFDM symbols in the first slot of the subframe, but the number of OFDM symbols included in the control region may change. The control region is assigned a PDCCH (physical downlink control channel) and other control channels and the data region is assigned a PDSCH.

As set forth in 3GPP TS 36.211 V10.2.0, 3GPP LTE/LTE-A physical control channels include a PDCCH (physical downlink control channel), a PCFICH (physical control format indicator channel), and a PHICH (physical hybrid-ARQ indicator channel).

The PCFICH transmitted on the first OFDM symbol in the subframe carries a CFI (control format indicator) regarding the number of OFDM symbols used for transmission of control channels in the subframe (i.e., size of control region). The wireless device receives the CFI over the PCFICH and then monitors the PDCCH.

Unlike the PDCCH, the PCFICH is transmitted through a fixed PCFICH resource in the subframe without being blind-decoded.

The PHICH carries an ACK (positive-acknowledgement)/NACK (negative-acknowledgement) signal for uplink HARQ (hybrid automatic repeat request). The ACK/NACK signal for the UL (uplink) data over the PUSCH transmitted by the wireless device is transferred on the PHICH.

The PBCH (Physical Broadcast Channel) is transmitted on the first four OFDM symbols in the second slot of the first subframe of the radio frame. The PBCH delivers system information necessary for the wireless device to communicate with the base station. The system information carried on the PBCH is referred to as MIB master information block). By comparison, the system information transmitted on the PDSCH indicated by the PDCCH is denoted SIB (system information block).

The control information transmitted through the PDCCH is denoted downlink control information (DCI). DCI may contain PDSCH resource allocation (which is denoted DL grant), PUSCH resource allocation (which is denoted UL grant), a set of transmission power control commands for the individual UEs in a UE group, and/or VoIP (voice over internet protocol) activation.

In 3 GPP LTE/LTE-A, a DL transport block is transmitted on a pair of PDCCH and PDSCH. A UL transport block is transmitted on a pair of PDCCH and PUSCH. For example, the wireless device receives a DL transport block over a PDSCH indicated by a PDCCH. The wireless device monitors the PDCCH in the DL subframe and receives DL resource allocation over the PDCCH. The wireless device receives a DL transport block on a PDSCH indicated by the DL resource allocation.

Figure 2:
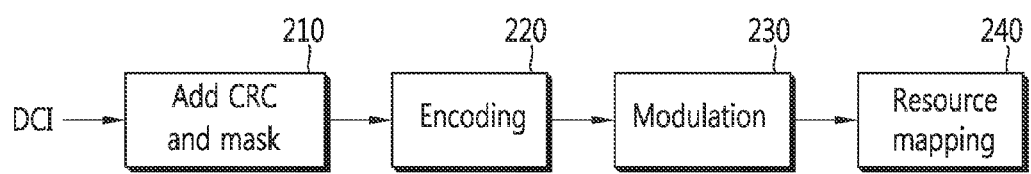
FIG. 2 is a block diagram illustrating the configuration of a PDCCH.

FIG. 2 is a block diagram illustrating the configuration of a PDCCH.

In 3GPP LTE/LTE-A, blind decoding is used to detect a PDCCH. Blind decoding is a scheme in which a desired identifier is demasked to a received PDCCH (this is called candidate PDCCH) and a CRC error is checked to thereby verify whether the PDCCH is its own control channel.

The base station determines a PDCCH format depending on a DCI that is to be sent to the wireless device, adds a CRC (cyclic redundancy check) to the DCI, and masks to the CRC a unique identifier (this is called RNTI (radio network temporary identifier) depending on the owner or purpose of the PDCCH (block 210).

In case the PDCCH is for a specific wireless device, the wireless device's unique identifier, e.g., C-RNTI (cell-RNTI), may be masked to the CRC. Or, in case the PDCCH is for a paging message, a paging indication identifier, e.g., P-RNTI (Paging-RNTI), may be masked to the CRC. In case the PDCCH is for system information, a system information identifier, SI-RNTI (system information-RNTI), may be masked to the CRC. In order to indicate a random access response, which is responsive to transmission of a random access preamble, an RA-RNTI (random access-RNTI) may be masked to the CRC. In order to indicate a TPC (transmit power control) command for a plurality of wireless devices, a TPC-RNTI may be masked to the CRC.

If the C-RNTI is used, the PDCCH carries control information for a corresponding specific wireless device (this is called UE-specific control information), and if other RNTI is used, the PDCCH carries common control information that is received by all or plural wireless devices in the cell.

The CRC-added DCI is encoded, generating encoded data (block 220). Encoding includes channel encoding and rate matching.

The encoded data is modulated, thus generating modulation symbols (block 230).

The modulation symbols are mapped to physical resource elements (REs) (block 240). Each modulation symbol is mapped with an RE.

The control region in the subframe includes a plurality of control channel elements (CCEs). The CCE is a unit of logical allocation, which is used to provide a coding rate according to a state of a radio channel to the PDCCH, and corresponds to a plurality of REGs (resource element groups). An REG includes a plurality of resource elements. In accordance with the correlation between the number of CCEs and a coding rate provided by CCEs, the format and possible bit count of the PDCCH are determined.

One REG includes four REs and one CCE includes nine REGs. To configure one PDCCH, {1, 2, 4, 8}CCEs may be put to use, and each element in {1, 2, 4, 8} is denoted CCE aggregation level.

The number of CCEs used for transmission of the PDCCH is determined by the base station depending on a channel state. For example, one CCE may be used for transmission of the PDCCH in a wireless device having a good downlink channel state. In a wireless device having a poor downlink channel state, eight CCEs may be used for transmission of the PDCCH.

A control channel comprising one or more CCEs is subjected to per-REG interleaving, and after going through a cell ID (identifier)-based cyclic shift, is mapped with a physical resource.

Figure 3:
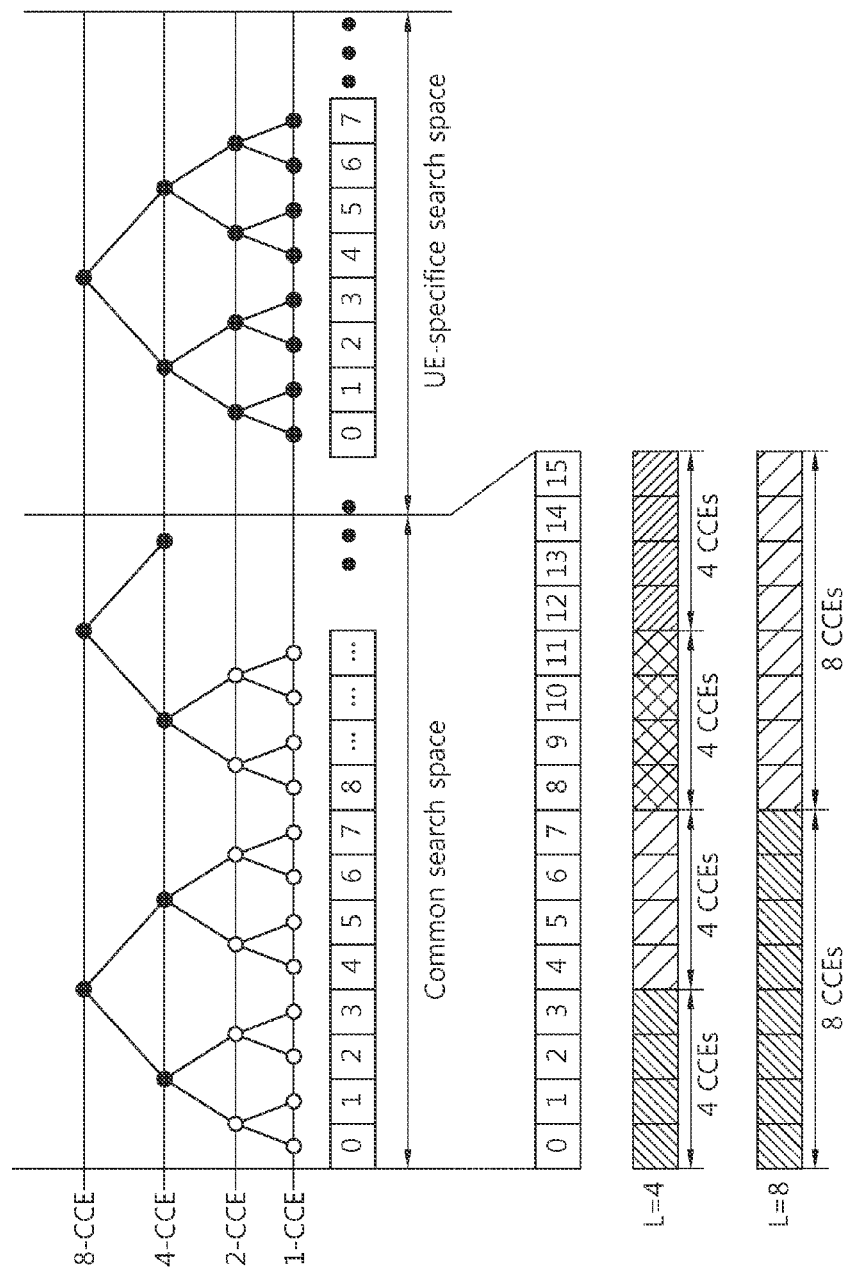
FIG. 3 is a view illustrating an example of monitoring PDCCH.

FIG. 3 shows an example of PDCCH monitoring. Refer to section 9 of 3GPP TS 36.213 V10.2.0 (2011-06).

In 3GPP LTE, blind decoding is adopted to detect a PDCCH. Blind decoding is a scheme in which a desired identifier is demasked to a CRC of a received PDCCH (this is called PDCCH candidate) and a CRC error is checked to thereby identify whether the corresponding PDCCH is its own control channel. The wireless device is not aware of what CCE aggregation level or DCI format its PDCCH uses at what position in the control region.

A plurality of PDCCHs may be sent in one subframe. The wireless device monitors a plurality of PDCCHs for every subframe. Here, the monitoring refers to the wireless device attempting to decode the PDCCH depending on the format of the PDCCH to be monitored.

In 3GPP LTE, a search space is used to lessen burden due to blind decoding. The search space may be a CCE's monitoring set for the PDCCH. The wireless device monitors the PDCCH in the corresponding search space.

Search spaces are divided into a common search space and a UE-specific search space. The common search space is a space for searching a PDCCH having common control information and consists of 16 CCEs indexed 0 to 15 while supporting a PDCCH having a CCE aggregation level of {4, 8}. However, a PDCCH (DCI format 0, 1A) conveying UE-specific information may also be transmitted in the common search space. The UE-specific search space supports a PDCCH having a CCE aggregation level of {1, 2, 4, 8}.

The following Table 1 represents the number of PDCCH candidates to be monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, |
|  | 2 | 12 | 6 | 1B, 1D, |
|  | 4 | 8 | 2 | 2, 2A |
|  | 8 | 16 | 2 |  |
| Common | 4 | 16 | 4 | 0, 1A, 1C, |
|  | 8 | 16 | 2 | 3/3A |

The size of search space is determined by Table 1 above, and different start points of search space are defined for the common search space and the UE-specific search space, respectively. The start point of the common search space is fixed irrespective of subframes, whereas the start point of the UE-specific search space may vary depending on UE identifiers (e.g., C-RNTI), CCE aggregation levels, and/or slot numbers in the radio frame. In case the start point of the UE-specific search space is positioned in the common search space, the UE-specific search space may overlap the common search space.

In aggregation level L∈{1,2,3,4}, search space S(L)k is defined as a PDCCH candidate set. The CCE corresponding to PDCCH candidate m in search space S(L)k is given as follows:

$$L \cdot \{(Y_k + m') \bmod \lfloor N_{CCE,k}/L \rfloor\} + i \qquad \text{[Equation 1]}$$

Here, i=0, 1, . . . , L−1, m=0, . . . , $M^{(L)}$−1, $N_{CCE,k}$ is the total number of CCEs that may be used for transmission of PDCCH in the control region of subframe k. The control region contains a set of CCEs numbered 0 to $N_{CCE,k}$−1. $M_{(L)}$ is the number of PDCCH candidates in CCE aggregation level L in the given search space.

If a CIF (carrier indicator field) is set to the wireless device, m'=m+$M^{(L)}n_{cif}$, where $n_{cif}$ is a CIF value. If no CIF is set to the wireless device, m'=m.

In the common search space, $Y_k$ is set as 0 for two aggregation levels, L=4 and L=8.

In the UE-specific search space of aggregation level L, variable $Y_k$ is defined as follows:

$$Y_k = (A \cdot Y_{k-1}) \bmod D$$

Here, $Y_{-1}$=nRNTI≠0, A=39827, D=65537, k=floor($n_s$/2), and $n_s$ is a slot number in the radio frame.

When the wireless device monitors the PDCCH based on C-RNTI, a DCI format to be monitored is determined depending on the transmission mode of the PDSCH. The following table shows an example of monitoring a PDCCH having a C-RNTI configured.

TABLE 2

| Transmission mode | DCI format | Search space | Transmission mode of PDSCH based on PDCCH |
|---|---|---|---|
| Mode 1 | DCI format 1A | common and UE-specific | single-antenna port, port 0 |
|  | DCI format 1 | UE-specific | single-antenna port, port 0 |
| Mode 2 | DCI format 1A | common and UE-specific | transmit diversity |

TABLE 2-continued

| Transmission mode | DCI format | Search space | Transmission mode of PDSCH based on PDCCH |
|---|---|---|---|
| Mode 3 | DCI format 1 | UE-specific | transmit diversity |
| | DCI format 1A | common and UE-specific | transmit diversity |
| | DCI format 2A | UE-specific | CDD(Cyclic Delay Diversity) or transmit diversity |
| Mode 4 | DCI format 1A | common and UE-specific | transmit diversity |
| | DCI format 2 | UE-specific | closed-loop spatial multiplexing |
| Mode 5 | DCI format 1A | common and UE-specific | transmit diversity |
| | DCI format 1D | UE-specific | MU-MIMO(Multi-User Multiple Input Multiple Output) |
| Mode 6 | DCI format 1A | common and UE-specific | transmit diversity |
| | DCI format 1B | UE-specific | closed-loop spatial multiplexing |
| Mode 7 | DCI format 1A | common and UE-specific | If the number of PBCH transmission ports is 1, single antenna port, otherwise, port 0, or transmit diversity |
| | DCI format 1 | UE-specific | single antenna port, port 5 |
| Mode 8 | DCI format 1A | common and UE-specific | If the number of PBCH transmission ports is 1, single antenna port, otherwise, port 0, or transmit diversity |
| | DCI format 2B | UE-specific | Dual layer transmission (port 7 or 8), or single antenna port, port 7 or 8 |

The purposes of the DCI format are classified as follows:

TABLE 3

| DCI format | Details |
|---|---|
| DCI format 0 | Used for PUSCH scheduling |
| DCI format 1 | Used for scheduling of one PDSCH codeword |
| DCI format 1A | Used for compact scheduling of one PDSCH codeword and random access process |
| DCI format 1B | Used for compact scheduling of one PDSCH codeword having precoding information |
| DCI format 1C | Used for very compact scheduling of one PDSCH codeword |
| DCI format 1D | Used for compact scheduling of one PDSCH codeword having precoding and power offset information |
| DCI format 2 | Used for PDSCH scheduling of UEs set in closed-spatial multiplexing mode |
| DCI format 2A | Used for PDSCH scheduling of UEs set in open-loop spatial multiplexing mode |
| DCI format 3 | Used for transmission of TPC command of PUCCH and PUSCH having two-bit power adjustment |
| DCI format 3A | Used for transmission of TPC command of PUCCH and PUSCH having one-bit power adjustment |

3GPP LTE HARQ is now described.

3GPP LTE adopts synchronous HARQ for uplink transmission and asynchronous HARQ for downlink transmission. Synchronous HARQ means re-transmission timing being fixed, and asynchronous HARQ means re-transmission timing being not fixed. That is, in synchronous HARQ, initial transmission and re-transmission are conducted at an HARQ period.

Figure 4:
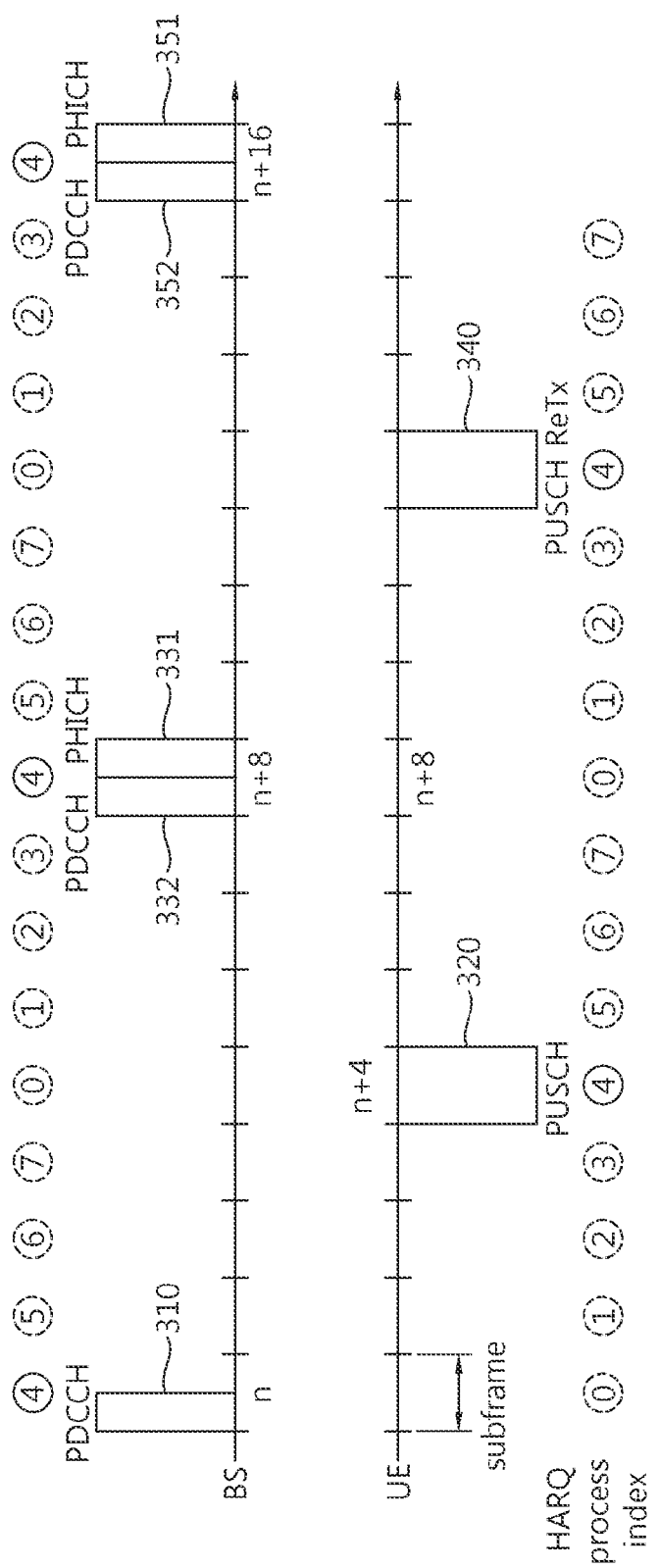
FIG. 4 shows a 3GPP LTE uplink synchronous HARQ.

FIG. 4 shows a 3GPP LTE uplink synchronous HARQ.

A wireless device receives an initial UL grant from a base station over a PDCCH 310 in an nth subframe.

The wireless device transmits a UL transport block over a PUSCH 320 using the initial UL grant in an n+4th subframe.

The base station sends an ACK/NACK signal responsive to the UL transport block over a PHICH 331 in an n+8th subframe. The ACK/NACK signal confirms reception of the UL transport block. The ACK signal denotes success of reception, and the NACK signal denotes failure of reception. When the ACK/NACK signal is an NACK signal, the base station may send a re-transmission UL grant over a PDCCH 332 or may not send a separate UL grant.

When receiving an NACK signal, the wireless device sends a re-transport block on a PUSCH 340 in an n+12th subframe. For transmission of the re-transport block, when receiving a re-transmission UL grant over the PDCCH 332, the wireless device uses the received re-transmission UL grant, and when not receiving the re-transmission UL grant, the wireless device uses the initial UL grant.

The base station sends an ACK/NACK signal responsive to the UL transport block over a PHICH 351 in an n+16th subframe. When the ACK/NACK signal is an NACK signal, the base station may send a re-transmission UL grant over a PDCCH 352 or may not send a separate UL grant.

After initial transmission in the n+4th subframe, re-transmission is done in the n+12th subframe. Accordingly, synchronous HARQ is performed at a HARQ period of eight subframes.

Accordingly, in 3GPP LTE, eight HARQ processes may be conducted, which are indexed 0 to 7.

Figure 5:
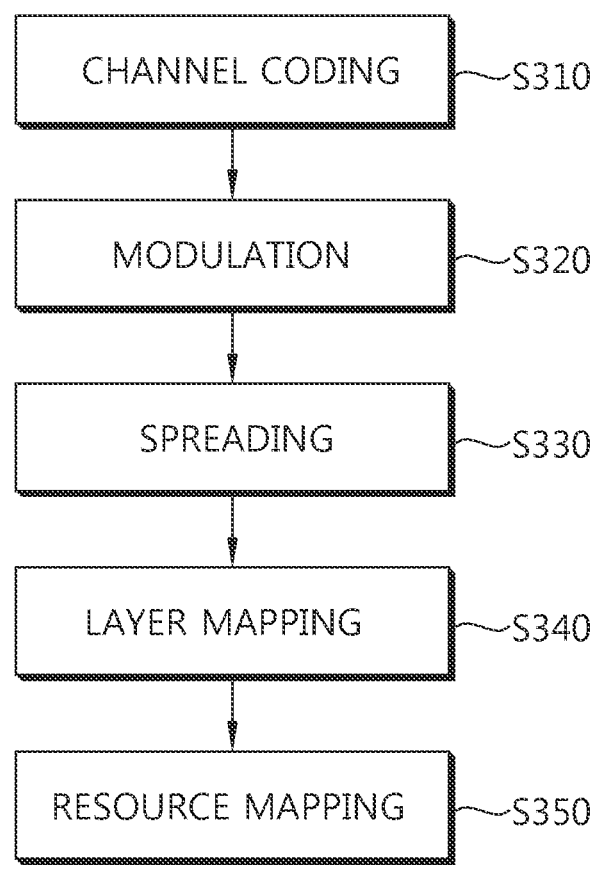
FIG. 5 is a block diagram illustrating the configuration of a 3GPP LTE PHICH.

FIG. 5 is a block diagram illustrating the configuration of a 3GPP LTE PHICH.

One PHICH transmits a PUSCH of one wireless device, i.e., only a one-bit ACK/NACK for a single stream.

In step S310, a one-bit ACK/NACK is coded to three bits using a repetition code with a code rate of ⅓.

In step S320, the coded ACK/NACK is modulated by BPSK (Binary Phase Key-Shifting), thereby generating three modulation symbols.

In step S330, the modulation symbols are spread using an orthogonal sequence. In normal CP, SF (Spreading Factor) $N^{PHICH}_{SF}=4$, and in extended CP, $N^{PHICH}_{SF}=2$. The number of orthogonal sequences used is $N^{PHICH}_{SF}*2$ for application of I/Q multiplexing. PHICHs spread using $N^{PHICH}_{SF}*2$ orthogonal sequences may be defined as one PHICH group.

The following table represents orthogonal sequences for PHICHs.

TABLE 4

| | Orthogonal sequence | |
|---|---|---|
| Sequence index $n^{seq}_{PHICH}$ | normal CP $N^{PHICH}_{SF} = 4$ | extended CP $N^{PHICH}_{SF} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | |
| 5 | [+j −j +j −j] | |
| 6 | [+j +j −j −j] | |
| 7 | [+j −j −j +j] | |

In step S340, layer mapping is conducted on spread symbols.

In step S350, the layer-mapped symbols are subjected to resource mapping, and are then transmitted.

A plurality of PHICHs mapped with the same set of resource elements constitute a PHICH group, and the PHICHs in the PHICH group are distinguished from each other by different orthogonal sequences. In FDD (frequency division duplex), the number of PHICH groups, NgroupPHICH, are constant in all subframes and is given as follows.

$$N_{PHICH}^{group} = \begin{cases} ceil(N_g(N_{RB}^{DL}/8)) & \text{for normal } CP \\ 2ceil(N_g(N_{RB}^{DL}/8)) & \text{for extended } CP \end{cases} \quad \text{[Equation 3]}$$

Here, Ng is a parameter that is transmitted over a PBCH (Physical Broadcast Channel) and Ng∈{⅙,½,1,2}. NDLRB denotes the number of downlink RBs.

ceil(x) is a function that outputs the minimum value from among integers not less than x. floor(x) is a function that outputs the maximum value from among integers not more than x.

The wireless device identifies a PHICH resource used by a PHICH with an index pair ($n^{group}_{PHICH}$, $n^{Seq}_{PHICH}$). A PHICH group index has a value from 0 to $N^{group}_{PHICH}$−1. An orthogonal sequence index $n^{seq}_{PHICH}$ denotes an index of an orthogonal sequence.

The index pair ($n^{group}_{PHICH}$, $n^{seq}_{PHICH}$) is given as follows.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\text{floor}(I_{PRB\_RA}^{lowest\_index}/N_{PHICH}^{group}) + n_{DMRS}) \bmod 2N_{SF}^{PHICH} \quad \text{[Equation 4]}$$

Here, $n_{DMRS}$ denotes a cyclic shift of a DMRS (demodulation reference signal) in the latest UL grant for a transport block associated with its corresponding PUSCH transmission. The DMRS is an RS used for PUSCH transmission. NPHICHSF is the SF size of an orthogonal sequence used for PHICH modulation. $I^{lowest\_index}_{PRB\_RA}$ is the smallest PRB index in the first slot of corresponding PUSCH transmission. IPHICH is 0 or 1.

'PRB' (Physical Resource Block) denotes a unit frequency-time resource for transmitting data. One PRB is constituted of a plurality of consecutive REs in the frequency-time domain. Hereinafter, "RB" has the same concept as "PRB."

Figure 6:
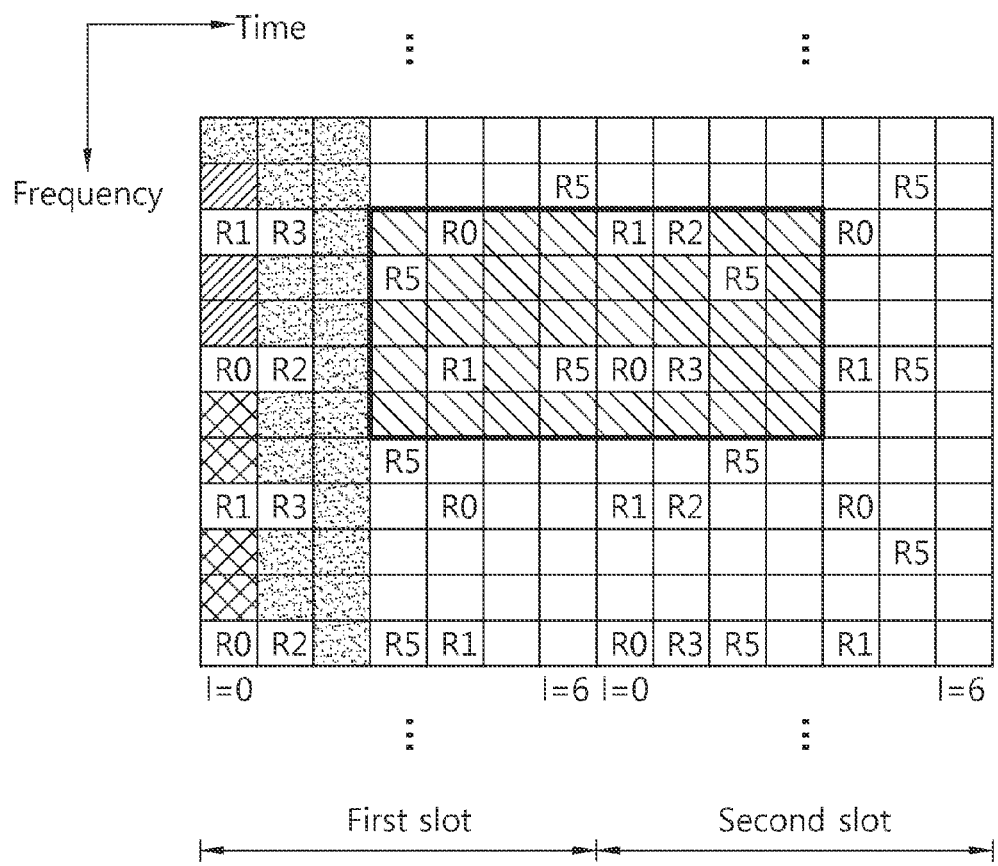
FIG. 6 shows an example in which a reference signal and a control channel are arranged in a 3GPP LTE DL subframe.

FIG. 6 shows an example in which a reference signal and a control channel are arranged in a 3GPP LTE DL subframe.

A control region (or PDCCH region) contains up to first OFDM symbols, and a data region where a PDSCH is transmitted contains the remaining OFDM symbols.

In the control region, PCFICH, PHICH, and/or PDCCH are transmitted. The CIF of a PCFICH indicates three OFDM symbols. The control region except the resource where PCFICH and/or PHICH are transmitted becomes a PDCCH region for monitoring PDCCH.

In a subframe, various reference signals are transmitted.

A CRS (cell-specific reference signal) may be received by all the wireless devices in a cell and is transmitted over the entire downlink band. In the drawings, 'R0' denotes an RE (resource element) where a CRS for a first antenna port is transmitted, 'R1' an RE where a CRS for a second antenna port is transmitted, 'R2' an RE where a CRS for a third antenna port is transmitted, and 'R3' an RE where a CRS for a fourth antenna port is transmitted.

An RS sequence for a CRS, rl,ns(m), is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 5]}$$

Here, m=0, 1, . . . , $2N_{maxRB}$−1, $N_{maxRB}$ is the maximum number of RBs, ns is a slot number in a radio frame, and 'l' is an OFDM symbol number in a slot.

A pseudo-random sequence c(i) is defined by a gold sequence having a length of 31 as follows.

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 6]}$$

Here, Nc=1600, and the first m-sequence is initialized as $x_1(0)=1$, $x_1(n)=0$, m=1, 2, . . . , 30.

The second m-sequence is initialized as $c_{init}=2^{10}(7(n_s+1)+l+1)(2N^{cell}_{ID}+1)+2N^{cell}_{ID}+N_{CP}$ at the beginning of each OFDM symbol. $N^{cell}_{ID}$ is a cell's PCI (physical cell identity), and in normal CP, $N_{CP}=1$, and in extended CP, $N_{CP}=0$.

In a subframe, URS (UE-specific reference signal) is transmitted. Although a CRS is transmitted in the entire subframe, the URS is transmitted in the data region of the subframe and is used for demodulating a corresponding PDSCH. In the drawings, 'R5' denotes an RE where a URS is transmitted. The URS is also referred to as a DRS (dedicated reference signal) or DM-RS (demodulation reference signal).

URS is transmitted in only RB where a corresponding PDSCH is mapped. In the drawings, although R5 is also marked at the region except where PDSCH is transmitted, this is for the purpose of indicating the position of an RE where a URS is mapped.

URS is used only by wireless device(s) receiving PDSCH. An RS sequence rns(m) for a US is the same as Equation 3. At this time, m=0, 1, . . . , $12N_{PDSCH,RB}$−1, and $N_{PDSCH,RB}$ is the number of RBs in PDSCH transmission. A pseudo-random number generator is initialized as $c_{init}=(\text{floor}(n_s/2)+1)(2^{N_{cell}}_{ID}+1)2^{16}+n_{RNTI}$ at the beginning of each subframe. $n_{RNTI}$ is a wireless device's identifier.

The above example is directed towards where URS is transmitted through a single antenna. When URS is transmitted through multiple antennas, the pseudo-random number generator is initialized as $c_{init}=(\text{floor}(n_s/2)+1)(2N^{cell}_{ID}+1)2^{16}+n_{SCID}$ at the beginning of each subframe. $n_{SCID}$ is a parameter obtained from a DL grant (e.g., DCI format 2B or 2C) related with PDSCH transmission.

URS supports MIMO (Multiple Input Multiple Output) transmission. An RS sequence for URS according to antenna ports or layers may be spread to a spread sequence as follows.

TABLE 5

| layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

Layer may be defined as an information path to a precoder. Rank is the number of non-zero eigenvalues in a MIMO channel matrix and is the same as the number of layers or the number of space streams. Layer may correspond to antenna port distinguishing URSs and/or spread sequence applied to a URS.

Meanwhile, a PDCCH is monitored in a limited region, control region in a subframe, and a CRS transmitted over the entire band is used for modulation of a PDCCH. As the type of control information is diversified and the amount of control information increases, scheduling flexibility is lowered only with existing PDCCHs. Further, in order to lessen burden due to CRS transmission, EPDCCH (enhanced PDCCH) is being introduced.

Figure 7:
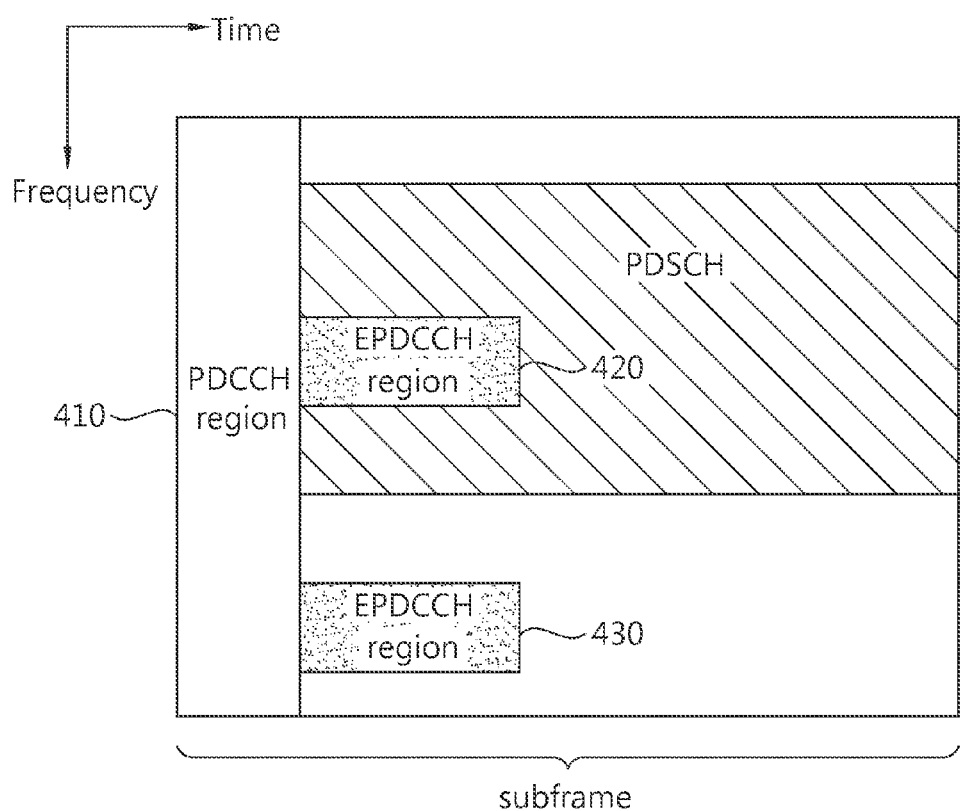
FIG. 7 shows an example subframe having an EPDCCH.

FIG. 7 is an example illustrating a subframe having an EPDCCH.

The subframe may contain zero or one PDCCH region 410 and zero or more EPDCCH regions 420 and 430.

The EPDCCH regions 420 and 430 are regions where a wireless device monitors EPDCCH. The PDCCH region 410 is positioned in up to first four OFDM symbols in the subframe, but the EPDCCH regions 420 and 430 may be flexibly scheduled in the OFDM symbols subsequent to the PDCCH region 410.

One or more EPDCCH regions 420 and 430 are designated in the wireless device, and the wireless device may monitor EPDCCH in the designated EPDCCH regions 420 and 430.

Information on the number/position/size of the EPDCCH regions 420 and 430 and/or subframe to monitor the EPDCCH may be provided from the base station to the wireless device through, e.g., an RRC message.

In the PDCCH region 410, a PDCCH may be demodulated based on a CRS. The EPDCCH regions 420 and 430 may define DM (demodulation) RS, not CRS, in order for demodulating the EPDCCH. Associated DM RSs may be transmitted in their corresponding EPDCCH regions 420 and 430.

An RS sequence $r_{ns}(m)$ for associated DM RSs is the same as Equation 3. At this time, $m=0, 1, \ldots, 12N_{RB}-1$ and $N_{RB}$ is the maximum number of RBs. The pseudo-random number generator may be initialized as $c_{init}=(\text{floor}(n_s/2)+1)(2N_{EPDCCH,ID}+1)216+n_{EPDCCH,SCID}$ at the beginning of each subframe. ns denotes a slot number in a radio frame, $N_{EPDCCH,ID}$ a cell index related with a corresponding EPDCCH region, and $n_{EPDCCH,SCID}$ a parameter given from upper layer signaling.

The EPDCCH regions 420 and 430 may be used for scheduling different cells. For example, an EPDCCH in the EPDCCH region 420 may carry scheduling information for a first cell, and an EPDCCH in the EPDCCH region 430 may carry scheduling information for a second cell.

When EPDCCHs are transmitted through multiple antennas in the EPDCCH regions 420 and 430, a DM RS in the EPDCCH regions 420 and 430 may be applied with the same precoding as an EPDCCH.

In contrast to a PDCCH using CCE as unit of transmission, a transmission resource unit for EPDCCH is referred to as ECCE (Enhanced Control Channel Element).

Aggregation level may be defined as resource unit of monitoring an EPDCCH. For example, when one ECCE is a minimum unit of EPDCCH, an aggregation level may be defined as L={1, 2, 4, 8, 16}.

Hereinafter, search space may correspond to an EPDCCH region. In a search space, one or more EPDCCH candidates may be monitored per one or more aggregation levels.

The EPHICH (Enhanced PHICH) is now described.

The conventional PHICH uses a predefined resource in the control region of a subframe. An EPHICH may be transmitted in the data region of a subframe and may be detected using blind decoding.

Figure 8:
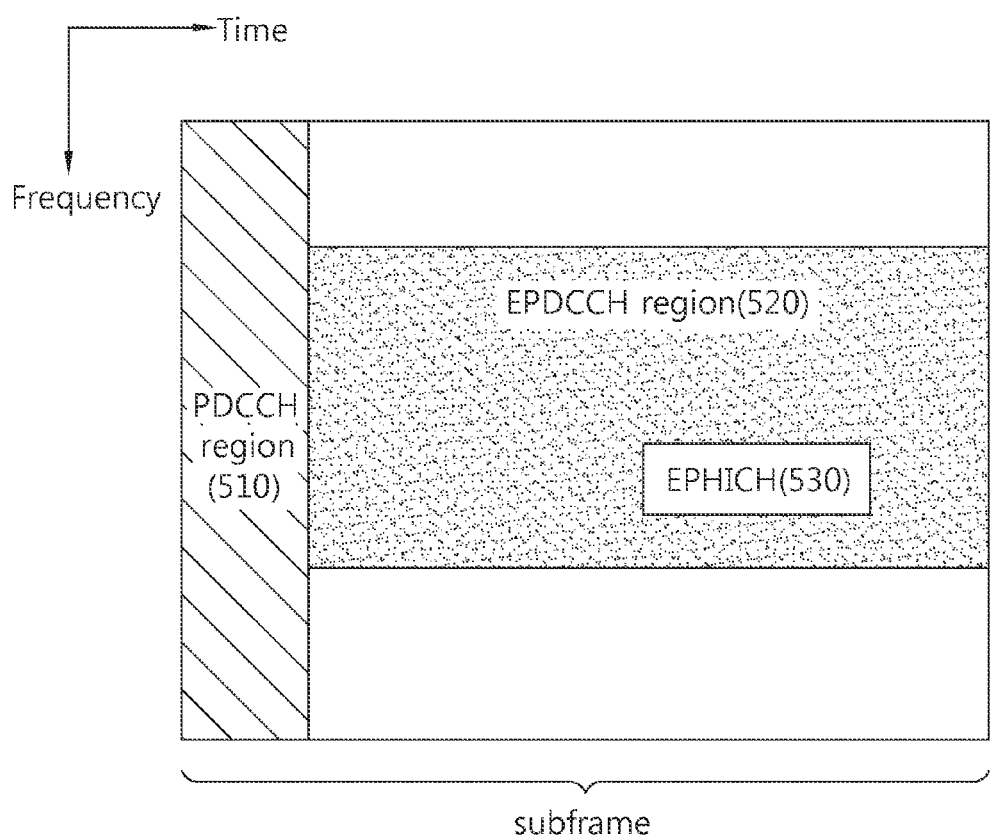
FIG. 8 shows an example subframe having an EPHICH according to an embodiment of the present invention.
Figure 8:
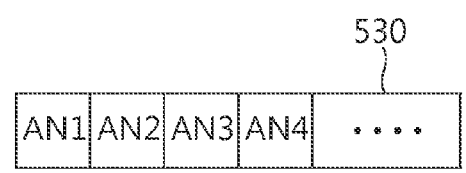

FIG. 8 is a view illustrating an example subframe having an EPHICH according to an embodiment of the present invention.

The subframe may contain zero or one PDCCH region 510 and zero or more EPDCCH regions 520. The EPDCCH region 520 is a search space for monitoring an EPDCCH and may be a search space for monitoring the EPHICH 530.

The EPHICH 530 may include a plurality of ACKs/NACKs in the form of a DCI format. In the drawings, 'ANx' denotes an xth ACK/NACK.

The EPDCCH region 520 may contain at least one of a common search space and a UE-specific search space. The EPHICH 530 may be monitored in the common search space and/or UE-specific search space.

For the wireless device to monitor the EPHICH 530, a separate identifier (e.g., EPHICH-RNTI) may be defined. Or, a group identifier (e.g., G-EPHICH-RNTI) may be defined per group, and each wireless device may monitor the EPHICH 530 for the group where it belongs.

Since the EPHICH 530 delivers a plurality of ACKs/NACKs for a plurality of wireless devices, which one of the plurality of ACKs/NACKs is for each of the plurality of wireless devices needs to be informed to the wireless devices.

The base station may inform each wireless device of the position of an ACK/NACK in the EPHICH 530 through signaling with, e.g., an upper layer message.

In case a wireless device group is established, in a UL grant grouped for the wireless device group, a logical index of the UL grant of a specific UE may be associated with the logical index of an ACK/NACK of the specific UE in the EPHICH.

Figure 9:
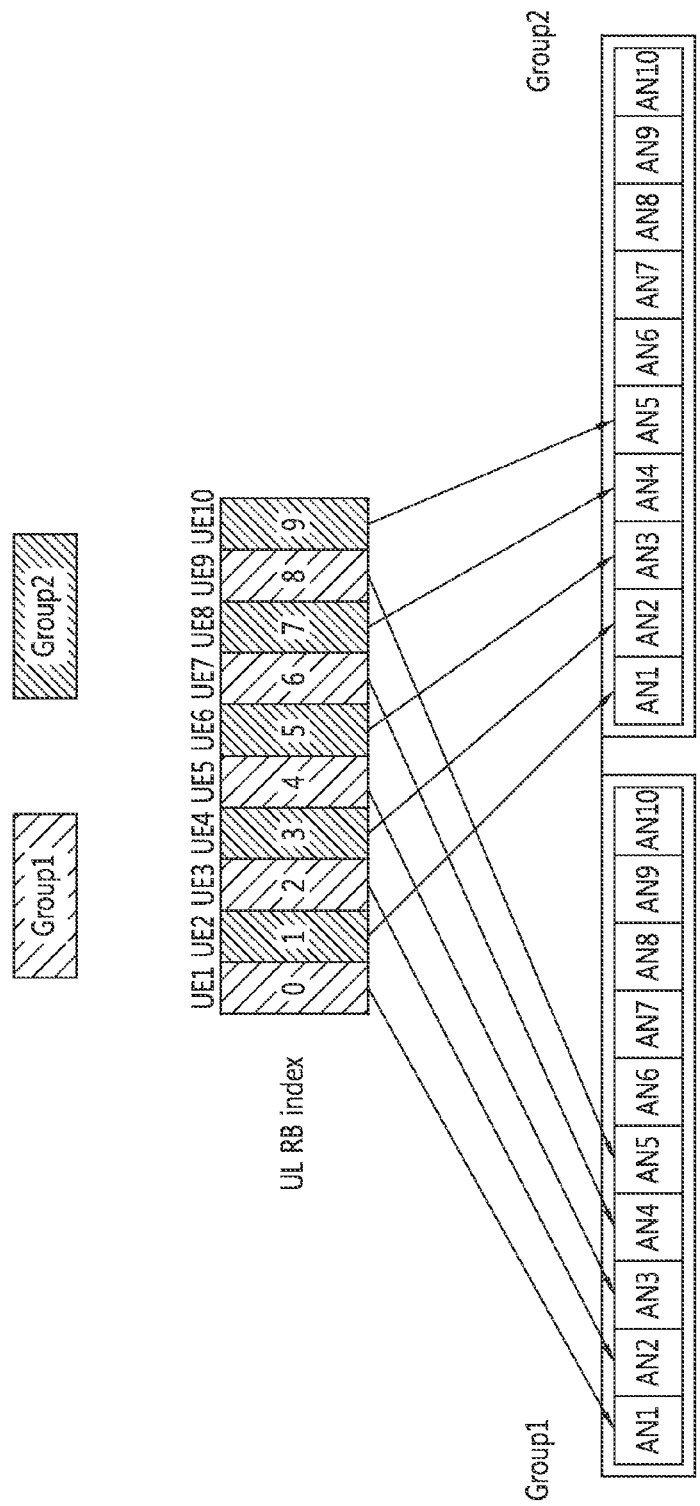
FIG. 9 illustrates a method of detecting an ACK/NACK in an EPHICH according to an embodiment of the present invention.

FIG. 9 is a view illustrating a method of detecting an ACK/NACK in an EPHICH according to an embodiment of the present invention.

Depending on UL RB indexes, a corresponding wireless device group and the position of an ACK/NACK in the wireless device group may be determined.

Assume that there are two wireless device groups, group 1 and group 2, and ten wireless devices UE1, . . . , UE10. 10 UL RBs are indexed 0 to 9. Indexes {0, 2, 4, 6, 8} belong to group 1 and respectively correspond to {AN1, AN2, AN3, AN4, AN5} in the EPHICH of group 1. Indexes {1, 3, 5, 7, 9} belong to group 2 and respectively correspond to {AN1, AN2, AN3, AN4, AN5} in the EPHICH of group 2.

For example, assume that UE3 is assigned UL RB index 2 through a UL grant. UE3 may identify itself belonging to group 1, and accordingly, detects an EPHICH based on a group identifier corresponding to group 1, and may verify that AN2 is its ACK/NACK in the detected EPHICH.

The EPHICH 530 is not monitored together with an EPDCCH in the EPDCCH region 520, and a separate search space for EPHICH (referred to as EPHICH search space) may be defined. The EPHICH search space may include a common search space and/or a UE-specific search space. The EPHICH search space may be assigned on a per-ECCC basis like the EPDCCH search space, and the EPHICH may be demodulated by a DM RS in the EPHICH search space.

Hereinafter, it is offered to split a subframe into a first part and a second part, with an EPDCCH search space defined in the first part, and an EPHICH search space defined in the second part. For clarity, although the first part and the second part are described as first and second slots, respectively, the subframe in the time domain and/or frequency domain may be separated into a plurality of parts.

Now assuming that an EPDCCH carries a DL grant (e.g., DL frame 1A) and a UL grant (e.g., DCI format 0), this is merely an example, and an EPDCCH may carry various DCI formats.

Although a first downlink control channel monitored in the first slot is now described as EPDCCH and a second downlink control channel monitored in the second slot as EPHICH, this is merely an example. The first downlink control channel may be EPHICH, and the second downlink control channel may be EPDCCH, and these may apply to various downlink control channels.

Figure 10:
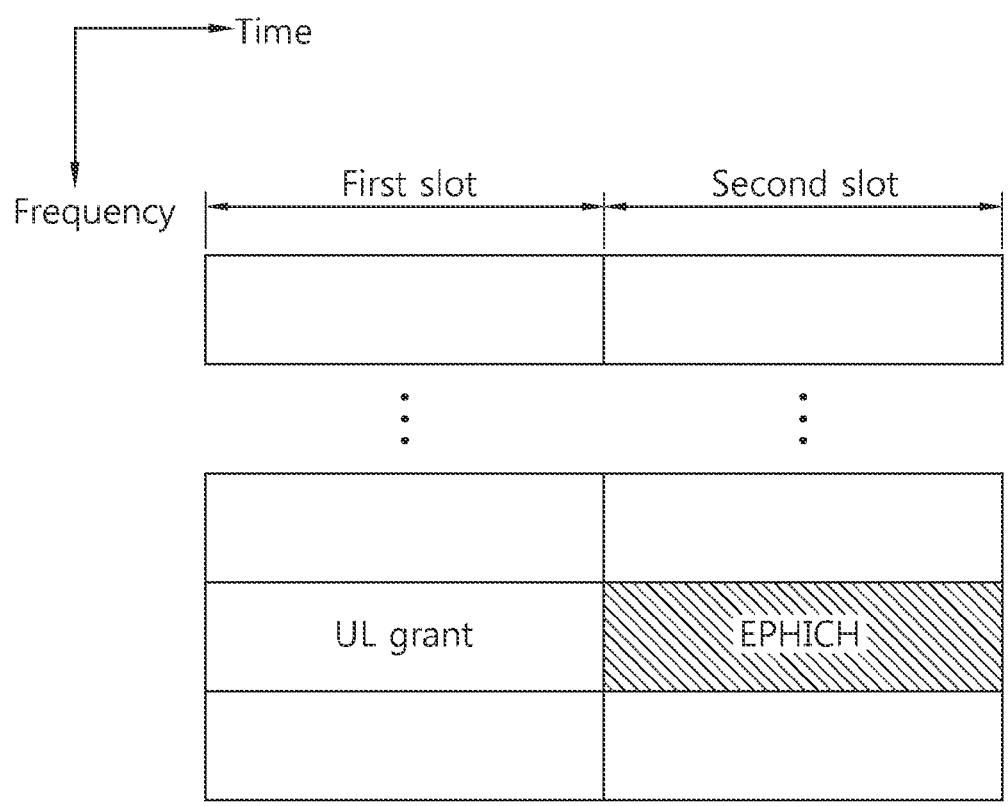
FIG. 10 illustrates a method of monitoring EPHICH according to an embodiment of the present invention.

FIG. 10 is a view illustrating a method of monitoring an EPHICH according to an embodiment of the present invention.

The base station transmits a UL grant in the first slot over an EPDCCH and an EPHICH in the second slot. The wireless device monitors an EPDCCH regarding the UL grant in the first slot and the EPHICH in the second slot.

The UL grant and the EPDCCH may be transmitted in one or more RB pairs. An RB pair includes a first slot RB and a second slot RB occupying the same frequency region. For example, assume that a subframe contains 100 RBs numbered 0 to 99. The base station transmits a UL grant in the RB indexed 50 in the first slot and may send an EPHICH in an RB indexed 50 in the second slot. The wireless device, upon detecting the UL grant in the first slot, expects the EPHICH to be transmitted in the PRB of the second slot having the same PRB index, thereby attempting to detect the EPHICH.

The base station may send out an EPDCCH having a UL grant in the first slot and a PDSCH in the second slot. However, upon failing to decode the EPDCCH, decoding the PDSCH may also fail. It might not be preferable to transmit a UL grant and a PDSCH in a RB pair.

According to the above-described methods, as a UL grant is transmitted, it is like a search space of EPHICH is defined. Accordingly, whether to monitor EPHICH need not be informed to the wireless device.

The EPHICH's search space may be defined based on the RB index of a PDCCH having a UL grant. Or, the EPHICH's search space may be defined based on the UL RB index in the UL grant.

A UL grant may be transmitted through a plurality of RBs. The EPHICH search space may be defined based on the lowest RB index or highest RB index among a plurality of RBs. For example, when a UL grant is transmitted in the RBs indexed 50 to 54 in the first slot, the EPHICH search space may begin with respect to index 50 or 54 of the second slot.

A UL grant may be transmitted through a plurality of RBs. It may be defined in some of the plurality of RBs in the EPHICH's search space. For example, when a UL grant is transmitted in the RBs indexed 50 to 54 of the first slot, the EPHICH search space may be defined in the RBs indexed 50 and 51 in the second slot.

An EPDCCH and an EPHICH may be defined in a single search space. That is, if one search space is defined over the second slot, the EPDCCH is monitored in the first slot, and the EPHICH is monitored in the second slot.

Figure 11:
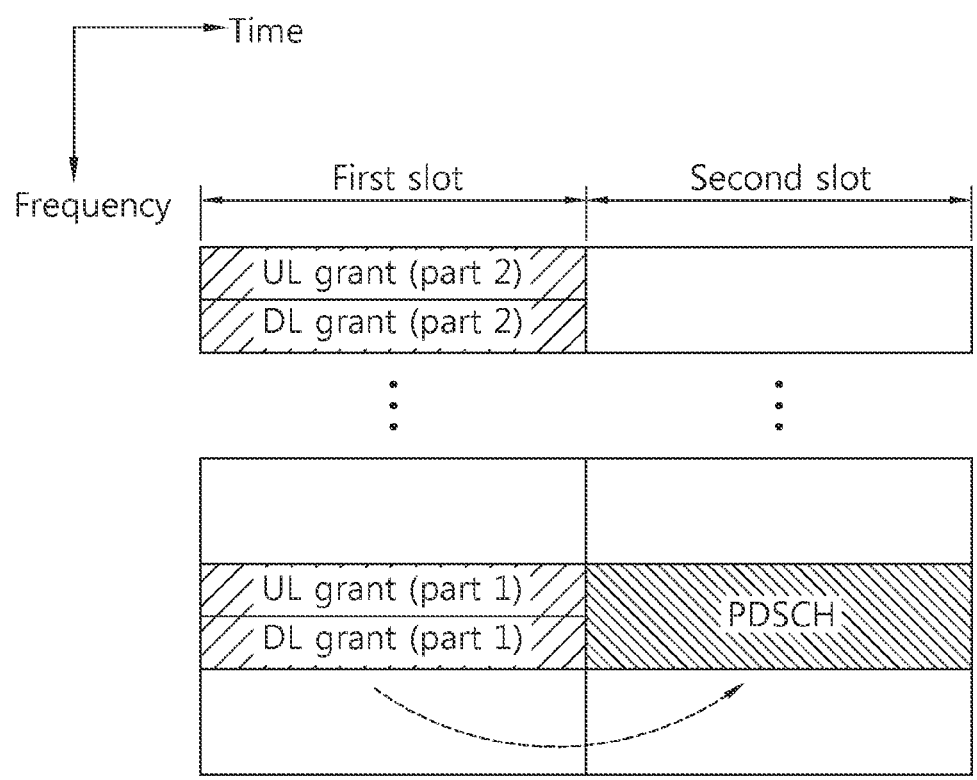
FIGS. 11 to 13 illustrate methods of monitoring EPHICH according to another embodiments of the present invention.
Figure 12:
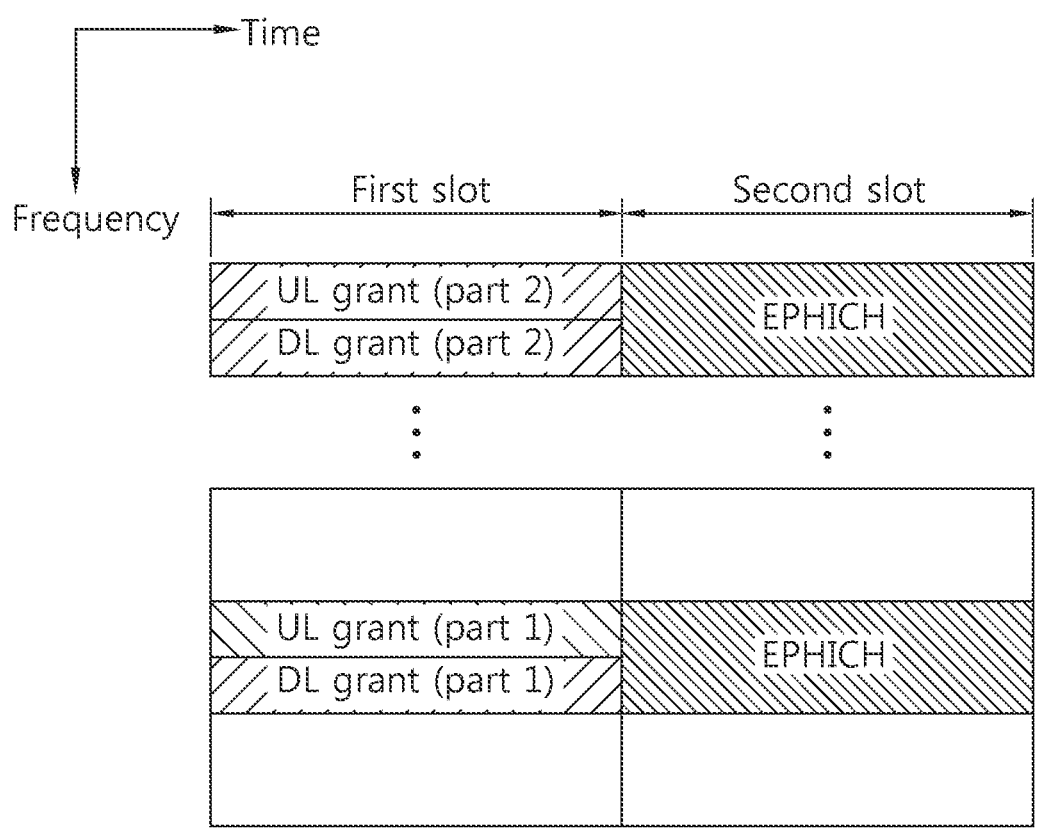
Figure 13:
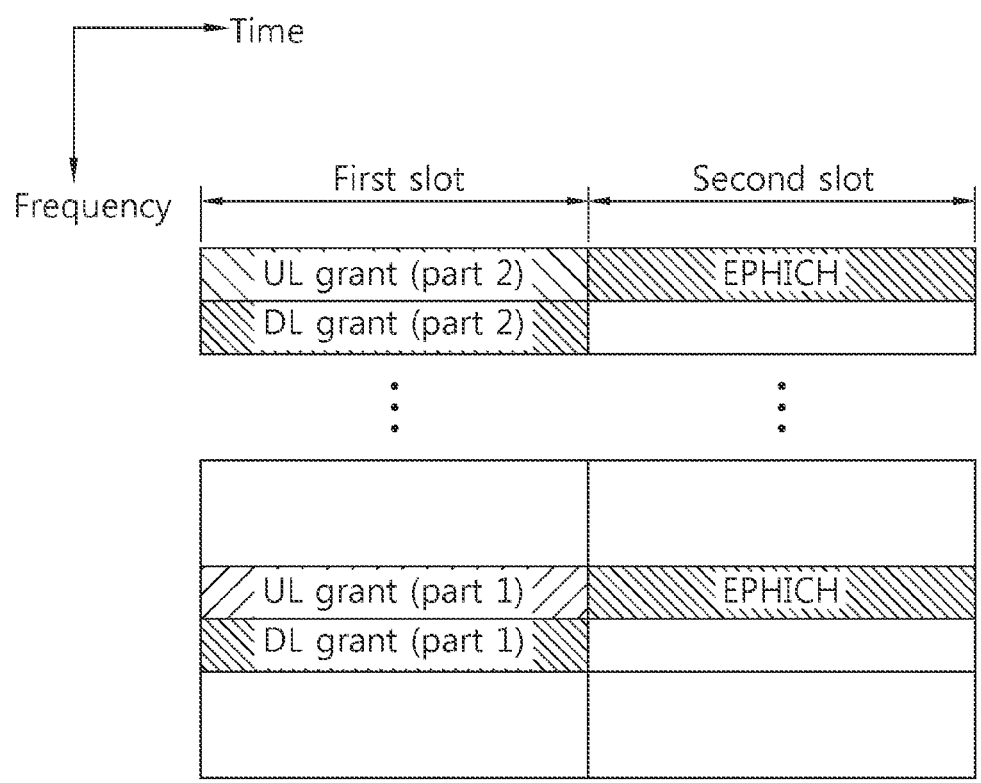

FIGS. 11 to 13 show methods of monitoring an EPHICH according to another embodiments of the present invention. When an EPDCCH search space is defined in a plurality of split regions, a method of defining an EPHICH search space is offered.

For example, assume that in an EPDCCH, a search space is defined in four RBs, with a first part of a DL grant transmitted through a first RB, a first part of a UL grant through a second RB, a second part of the DL grant through a third RB, and a second part of the UL grant through a fourth RB.

Also assume that the first RB and the second RB that are adjacent to each other are denoted a first search group and the third RB and the second RB adjacent to each other are denoted a second search group.

In accordance with the embodiment described in connection with FIG. 11, an EPHICH search space is defined in the first search group. In the embodiment shown in FIG. 12, an EPHICH search space is defined in all of the search groups. In the embodiment shown in FIG. 13, an EPHICH search space is defined in an RB where a UL grant is transmitted.

The above-described embodiments may be implemented alone or in combination. For example, a specific subframe may be applied with the embodiment shown in FIG. 10, and another subframe may be applied with the embodiment shown in FIG. 11.

Figure 14:
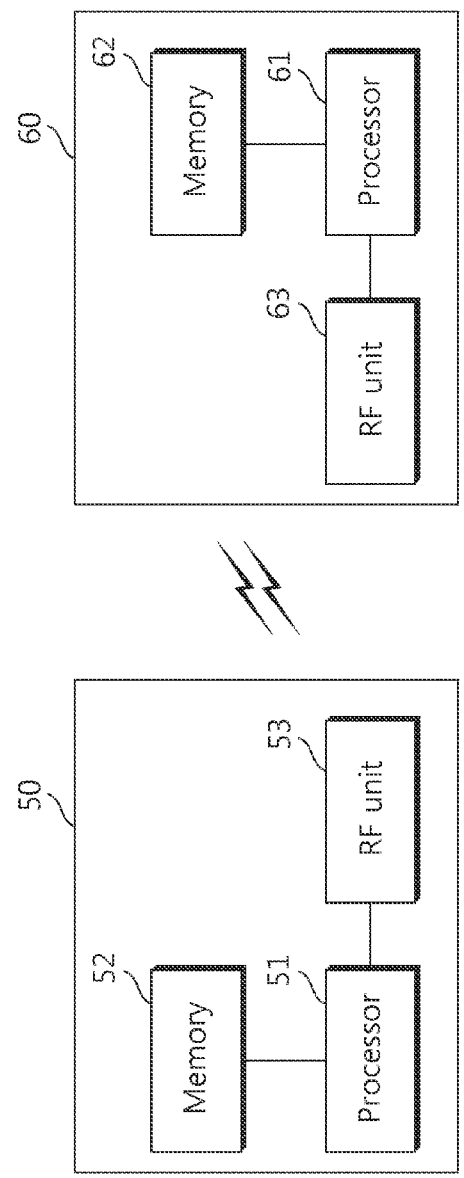
FIG. 14 is a block diagram illustrating a wireless communication system in which an embodiment of the present invention is implemented.

FIG. 14 is a block diagram illustrating a wireless communication system in which an embodiment of the present invention is implemented.

A base station 50 includes a processor 51, a memory 52, and an RF (radio frequency) unit 53. The memory 52 is connected with the processor 51 and stores various pieces of information for driving the processor 51. The RF unit 53 is connected with the processor 51 and transmits and/or receives radio signals. The processor 51 implements functions, processes, and/or methods as suggested herein. According to the above-described embodiments, the operation of the base station may be realized by the processor 51. The processor 51 may configure a search space for an EPDCCH and/or PHICH and send an EPDCCH and PHICH.

A wireless device 60 includes a processor 61, a memory 62, and an RF unit 63. The memory 62 is connected with the processor 61 and stores various pieces of information for driving the processor 61. The RF unit 63 is connected with the processor 61 and transmits and/or receives radio signals. The processor 61 implements functions, processes, and/or methods as suggested herein. In accordance with the above-described embodiments, the operation of the wireless device may be realized by the processor 61. The processor 61 may monitor an EPDCCH and an EPHICH in a search space.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of monitoring a control channel in a wireless communication system, the method comprising:
monitoring, by a wireless device, a first downlink control channel in a subframe including a first slot and a second slot in time domain;
detecting an uplink grant in the first slot;
determining, by the wireless device, a search space of the second slot for monitoring a second downlink control channel depending on a resource of the detected uplink grant; and
monitoring, by the wireless device, the second downlink control channel including a hybrid automatic repeat request (HARQ) positive-acknowledgement (ACK)/negative-acknowledgement (NACK) on the determined search space of the second slot,
wherein the uplink grant is detected in at least one first resource block (RB) of the first slot,
wherein the search space is determined in at least one second RB of the second slot, and
wherein a number of the at least one first RB is equal to or greater than a number of the at least one second RB.

2. The method of claim 1, wherein the first and second slots include a plurality of RBs.

3. The method of claim 1, wherein an index of the at least one first RB is equal to an index of the at least one second RB.

4. The method of claim 1, wherein the first downlink control channel is monitored based on an identifier of the wireless device, and the second downlink control channel is monitored based on an identifier of a group to which the wireless device belongs.

5. The method of claim 1, wherein the first downlink control channel is an enhanced physical downlink control channel (EPDCCH), and the second downlink control channel is an enhanced physical HARQ indicator channel (EPHICH).

6. A wireless device for monitoring a control channel in a wireless communication system, the wireless device comprising:
a radio frequency (RF) unit configured to transmit and receive a radio signal; and
a processor operatively connected with the RF unit and configured to:
monitor, via the RF unit, a first downlink control channel in a subframe including a first slot and a second slot in time domain,
detect an uplink grant in the first slot,
determine a search space of the second slot for monitoring a second downlink control channel depending on a resource of the detected uplink grant, and
monitor, via the RF unit, the second downlink control channel including a hybrid automatic repeat request (HARQ) positive-acknowledgement (ACK)/negative-acknowledgement (NACK) on the determined search space of the second slot,
wherein the uplink grant is detected in at least one first resource block (RB) of the first slot,
wherein the search space is determined in at least one second RB of the second slot, and
wherein a number of the at least one first RB is equal to or greater than a number of the at least one second RB.

7. The wireless device of claim 6, wherein the first and second slots include a plurality of RBs.

8. The wireless device of claim 6, wherein an index of the at least one first RB is equal to an index of the at least one second RB.

9. The wireless device of claim 6, wherein the first downlink control channel is an enhanced physical downlink control channel (EPDCCH), and the second downlink control channel is an enhanced physical HARQ indicator channel (EPHICH).

* * * * *